United States Patent

[11] 3,599,324

| | | |
|---|---|---|
| [72] | Inventor | Robert W. Peters<br>Menomone Falls, Wis. |
| [21] | Appl. No. | 861,523 |
| [22] | Filed | July 17, 1969 |
| [23] | | Division of Ser. No. 662,597, Aug. 23, 1967, Pat. No. 3,484,923 |
| [45] | Patented | Aug. 17, 1971 |
| [73] | Assignee | Lincoln Tool & Manufacturing Co. |

[54] METHOD FOR WINDING STATOR COILS
2 Claims, 3 Drawing Figs.

[52] U.S. Cl................................................. 29/596,
242/1.1 R, 242/1.1 E
[51] Int. Cl........................................................H02k 15/00
[50] Field of Search................................................ 29/596,
605, 205 R, 205 E; 242/1.1 R, 1.1 E; 310/215

[56] References Cited
UNITED STATES PATENTS
3,227,382  1/1966  Frederick.................  242/1.1 E
3,334,825  8/1967  Friedrich...................  242/1.1 R Primary Examiner—John F. Campbell
Assistant Examiner—Carl E. Hall
Attorney—Wheeler, Wheeler, House & Clemency ABSTRACT: A stator winding machine attachment which is adapted to be mounted on a stator prior to winding and includes a pair of semicircular members hingedly connected together for movement from an open to a closed position. A number of tabs are equally spaced around the interior edge of each of the members in corresponding relation to the distance between the slots in the stator. The attachment includes a locator ear which projects inwardly from the interior edge of one of the members to positively locate the attachment relative to the stator.

PATENTED AUG 17 1971 3,599,324

Inventor
Robert W. Peters

METHOD FOR WINDING STATOR COILS

This application is a division of my copending application, Ser. No. 662,597, filed Aug. 23, 1967, now U.S. Pat. No. 3,484,923, issued Dec. 23, 1969.

BACKGROUND OF THE INVENTION

This invention relates to the winding of stators and more particularly to an attachment which is used in conjunction with an automatic stator winding machine.

Automatic winding machines for winding stator coils include a reciprocally movable shuttle such as shown in the Friedrich application Ser. No. 340,302. These machines include a reciprocally movable shuttle having a winding head at one end with a number of lift levers supporting wire guides. As the winding head emerges from the bore of the stator, the wire guides are moved radially outwardly. This movement by the wire guides impose a strain on the end of the insulators which are positioned in the slots of the stator, often distorting or damaging the insulator so that it effectiveness is reduced if not destroyed.

SUMMARY OF THE INVENTION

The primary object of the present invention is to provide an attachment and method for its use which prevents such distortion of the wire insulator during the winding of the stator. This object is achieved by mounting an attachment on each end of the stator prior to mounting the stator in the stator winding machine. The attachment has a pair of semicircular members which are hingedly connected together so that the attachment can be opened, placed on the stator, and closed against the backs of the insulator. Upstanding tabs are provided on the inner edge of the attachment at spaced intervals corresponding to the location of the insulators in the slots of the stator. Each tab projects upwardly a distance substantially equal to the height of the insulator above the surface of the stator. A locating ear is provided between two of the tabs and projects inwardly for insertion between two adjacent insulators in the stator, thus positively locating the tabs in corresponding relation to the backs of the insulators.

Other objects and advantages will become apparent from the following detailed description when read in connection with the enclosed drawings in which.

Figures 1, 2, 3:
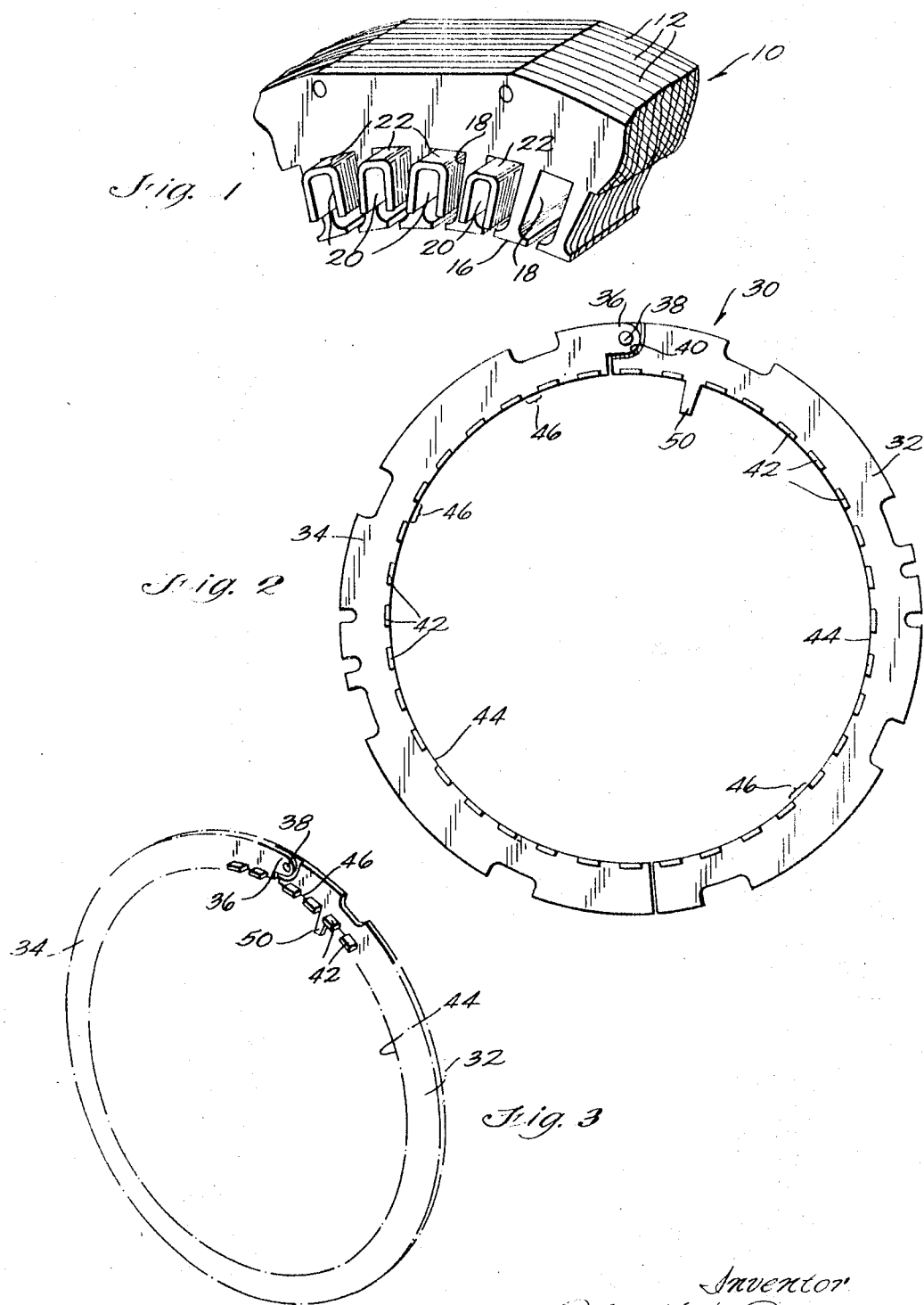
FIG. 1 is a perspective view of a section of the stator showing the wire insulation prior to winding.
FIG. 2 is a top view of the stator winding attachment in a closed position.
FIG. 3 is an end view of the attachment showing the spacing of the tabs.

Referring more particularly to FIG. 1 of the drawings, the stator 10 conveniently includes a series of lamina 12 which are assembled in registry with each other and are held together by any appropriate means. The stator has a central bore 16 with a series of slots 18 extending radially outwardly from the bore. U-shaped insulators 20 are respectively positioned in each of the slots and are turned back at each end to form lips 22 extending outwardly a short distance from the adjacent face of the stator. The wire coils are layed in part in the insulators in the slots and in part in arcuate form between the ends of the insulators and clear of the bore.

Such wire winding can be accomplished by means of an automatic wire-winding device such as shown in copending application, Ser. No. 340,302. As seen in application, Ser. No. 340,302 a winding head on the end of a shuttle is moved through the bore of the stator and oscillated after it emerges from each end of the bore to align the wire guides with different slots in the bore. After the winding bead emerges from the bore the lift levers in association with the head oscillation move the wire guides radially outwardly to produce the arcuate form of the wire between the slots. This radially outward movement can impose a strain on the lip of the insulator thereby causing the lip to bond and possibly break.

Referring to FIG. 2, the wire-winding attachment 30 includes two flat semicircular members 32 and 34 which are hingedly connected together by means of an extension or projecting part 36 on member 34 which part is pivotally connected to member 32 by means of a rivet 38. The part is movable within a recessed section 40 on the end of the member 3 to maintain a substantially smooth transition across the surface of the ring members.

The back of the lip on the ends of the insulators is supported during the wire winding by a number of equally spaced upstanding tabs 42 provided around the inner edge 44 of each of the ring members. The distance 46 between the tab corresponds to the distance between the insulators on the stator so that the tabs will be aligned with the backs of the insulators when the attachment is mounted on the stator. Each tab has a height which correspond substantially to the height of the insulator lip and thereby provides a support or reinforcement for the back of the insulator lip when the wire is pulled to the next slot by the oscillation of the winding head.

The attachment must be positively aligned on the face of the stator to assure that the tabs are properly located with respect to the insulators. This is accomplished by providing a locating ear 50 between two adjacent insulators.

An attachment is mounted on each end of a stator by the following method. The attachment is opened and aligned with the end face of the stator. Member 34 having ear 50 is moved into engagement with the insulators with the ear inserted between the lips of two adjacent insulators. Member 34 is then closed to form a complete circle with the tabs respectively aligned behind the backs of the insulator lips. When the stator is clamped in the automatic winding machine, the attachments on each end of the stator will be rigidly held in position by the clamping action. Other arrangements can be employed to hold the members on the stator.

Although only one embodiment of the present invention has been shown and described it would be apparent that various changes and modifications can be made therein without departing from the scope of the appended claims.

What is claimed is:

1. The method of winding wire in a stator to form coils, the stator having a plurality of radial slot extending from central bore and an insulator respectively located in each of the slots and intending outwardly from the end faces of the stator, said method comprising the steps of applying to each of the end faces of the stator an attachment having means for supporting the outwardly extending end of the insulator, winding wires in the insulators in the slot and arcuately between said slots clear of the bore while supporting the lips of the insulators by the attachment and removing the attachment from the stator after completion of the winding.

2. The method according to claim 1 wherein the applying step includes the steps of opening the attachment prior to mounting the attachment on the stator, aligning a tab on the attachment between two of the outwardly extending ends of the insulators on the stator, and closing the attachment with the tab inserted between the insulator.

PO-1050
(5/69)

UNITED STATES PATENT OFFICE
CERTIFICATE OF CORRECTION

Patent No. 3,599,324            Dated August 17, 1971

Inventor(s) Robert W. Peters

It is certified that error appears in the above-identified patent and that said Letters Patent are hereby corrected as shown below:

| | |
|---|---|
| Column 1, line 19 | "impose" should be --- imposes ---; |
| Column 1, line 20 | "it" should be --- its ---; |
| Column 2, line 3 | "bead" should be --- head --- |
| Column 2, line 14 | "3" should be --- 32 ---; |
| Column 2, line 20 | "tab" should be --- tabs ---; |
| Column 2, line 24 | "correspond" should be --- corresponds ---; |
| Column 2, line 49 | "slot" should be --- slots ---; |
| Column 2, line 49 | after "from" insert --- a ---; |
| Column 2, line 51 | "intending" should be --- extending ---; |
| Column 2, line 55 | "slot" should be --- slots ---; |
| Column 2, line 64 | "insulator" should be --- insulators ---. |

Signed and sealed this 4th day of July 1972.

(SEAL)
Attest:

EDWARD M. FLETCHER, JR.
Attesting Officer

ROBERT GOTTSCHALK
Commissioner of Patents